United States Patent
Kwak et al.

(10) Patent No.: US 7,725,322 B2
(45) Date of Patent: May 25, 2010

(54) SPOKEN DIALOGUE INTERFACE APPARATUS AND METHOD

(75) Inventors: Byung-kwan Kwak, Yongin-si (KR); Jae-won Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 358 days.

(21) Appl. No.: 11/348,301

(22) Filed: Feb. 7, 2006

(65) Prior Publication Data

US 2006/0184370 A1    Aug. 17, 2006

(30) Foreign Application Priority Data

Feb. 15, 2005    (KR)    ........................ 10-2005-0012361

(51) Int. Cl.
G10L 21/00    (2006.01)
G10L 13/00    (2006.01)
(52) U.S. Cl. ..................... 704/275; 704/270; 704/258
(58) Field of Classification Search ................. 704/275, 704/270, 9, 257, 258
See application file for complete search history.

(56) References Cited

U.S. PATENT DOCUMENTS

| | | | | |
|---|---|---|---|---|
| 6,044,347 | A * | 3/2000 | Abella et al. ................. | 704/272 |
| 6,330,537 | B1 * | 12/2001 | Davis et al. .................. | 704/257 |
| 6,356,869 | B1 | 3/2002 | Chapados et al. | |
| 6,505,162 | B1 * | 1/2003 | Wang et al. .................. | 704/275 |
| 6,513,006 | B2 * | 1/2003 | Howard et al. .............. | 704/257 |
| 6,604,090 | B1 | 8/2003 | Tackett et al. | |
| 6,631,346 | B1 * | 10/2003 | Karaorman et al. ............ | 704/9 |
| 6,786,651 | B2 | 9/2004 | Raj et al. | |
| 7,019,749 | B2 * | 3/2006 | Guo et al. .................... | 345/473 |
| 7,251,595 | B2 * | 7/2007 | Yasuda et al. .................. | 704/9 |
| 2002/0198714 | A1 * | 12/2002 | Zhou ........................... | 704/252 |
| 2005/0033582 | A1 * | 2/2005 | Gadd et al. .................. | 704/277 |

OTHER PUBLICATIONS

M McTear, "Spoken Dialogue Technology: Enabling the Conversational User Interfac e", ACM Computing Surveys, vol. 34, No. 1, Mar. 2002, pp. 90-169.*
"A Task-Independent Control Method for Spoken Dialogs", IEICE Transaction D-II vol. J86-DII No. 5, pp. 608-615, May 2003.
Japanese Office Action dated Sep. 1, 2009, issued in corresponding Japanese Patent Application No. 2006-25544.

* cited by examiner

Primary Examiner—Richmond Dorvil
Assistant Examiner—Jialong He
(74) Attorney, Agent, or Firm—Staas & Halsey LLP (57) ABSTRACT

The spoken dialogue interface apparatus according to an embodiment of the present invention includes a speech recognition module for recognizing a human's speech from a sound signal; a user intention interpretation module for extracting a sentence from the recognized speech and interpreting a user's intention based on the sentence; a user intention selection module for determining user intention using the interpreted user's intention and a predetermined domain action frame; and a system response generation module for generating a system response sentence corresponding to the selected user intention, wherein the domain action frame includes service information which the user requests, and parameter information which is used to perform a service, and the domain action frame is constructed to have a hierarchical tree structure.

12 Claims, 6 Drawing Sheets

FIG. 1

PRIOR ART

FIG. 2

PRIOR ART

FIG. 3

PRIOR ART

PRIOR ART

SPOKEN DIALOGUE INTERFACE APPARATUS AND METHOD

CROSS-REFERENCE TO RELATED APPLICATION

Priority is claimed to Korean Patent Application No. 10-2005-0012361 filed on Feb. 15, 2005 in the Korean Intellectual Property Office, the disclosure of which is incorporated herein by reference in its entirety.

BACKGROUND OF THE INVENTION

1. Field of the Disclosure

The present disclosure relates generally to a spoken dialogue interface and, more particularly, to a spoken dialogue interface apparatus and method, which, in a spoken dialogue system, provides a dialogue model capable of processing various dialogue states using the advantages of a conventional flame-based model and a conventional plan-based model, and can actively react to the mobility between domains and the expandability of service using the dialogue model.

2. Description of the Related Art

Figure 1:
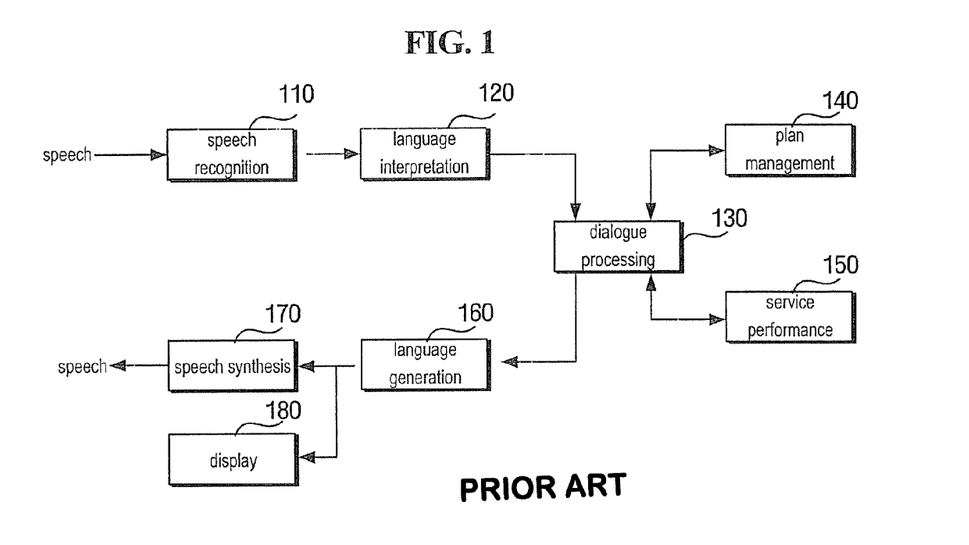
FIG. 1 is a block diagram showing a conventional spoken dialogue interface apparatus.

FIG. 1 is a block diagram showing the operation of a conventional spoken dialogue interface apparatus. First, the conventional spoken dialogue interface apparatus performs speech recognition on a user's speech (110). Then, the conventional spoken dialogue interface apparatus interprets the language spoken by the user by analyzing the recognized speech (120), and then performs dialogue processing using the interpreted language (130).

For example, when the interpreted language is a control command that controls a specific device, the conventional spoken dialogue interface apparatus performs an operation of controlling the corresponding device (150). Such an operation is referred to as "service performance" below.

The service performance may include the performance of information retrieval in response to a request made through a user's speech, besides the control of the specific device. That is, "service performance" refers to the performance of a specified operation that a user requests through speech.

Meanwhile, the conventional spoken dialogue interface apparatus can perform plan management 140 in the performance of the dialogue processing. The plan management 140 refers to the management and planning of a series of detailed operations required for the performance of a specific service. That is, when performing the dialogue processing 130, the conventional spoken dialogue interface apparatus sequentially performs services suitable for situations based on the plan management 140.

When the conventional spoken dialogue interface apparatus cannot interpret the language of the user's speech or receives the results of service performance, the conventional spoken dialogue interface apparatus must inform the user of it.

Therefore, the conventional spoken dialogue interface apparatus generates a language to be used to respond to the user based on a specific spoken dialogue model, and informs the user of the generated language through a predetermined display (180), or through a speech synthesis process 170 of transforming the responding language into speech and a speaker. The method shown in FIG. 1 is generally used in a spoken dialogue interface apparatus which recognizes a user's speech, interprets the recognized speech, performs a specific function and then verbally informs the user of performance results. Various spoken dialogue models have been proposed for the dialogue processing 130 about how to process the interpreted language. FIGS. 2 to 5 are diagrams illustrating examples of the four representatives of the various spoken dialogue models.

Figure 2:
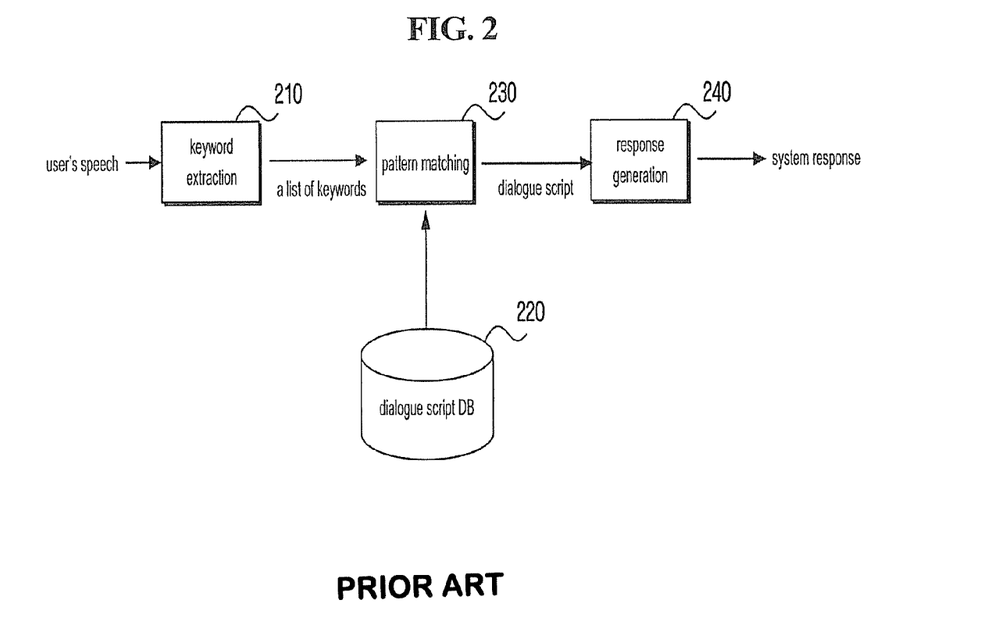
FIG. 2 is a diagram illustrating an example of a conventional spoken dialogue model using a pattern matching method.

FIG. 2 is a diagram illustrating an example of a conventional spoken dialogue model using pattern matching.

First, a plurality of keywords is extracted from a user's speech (210), and a pattern matching operation is performed using a list of extracted keywords and pattern information stored in a dialogue script DataBase (DB) (220). If a matching pattern exists, a corresponding dialogue script is selected and a response is generated using a template in the selected dialogue script (240). Then the spoken dialogue interface apparatus transfers the generated response to the user.

The spoken dialogue model using the pattern matching method is disclosed in U.S. Pat. No. 6,604,090.

Figure 3:
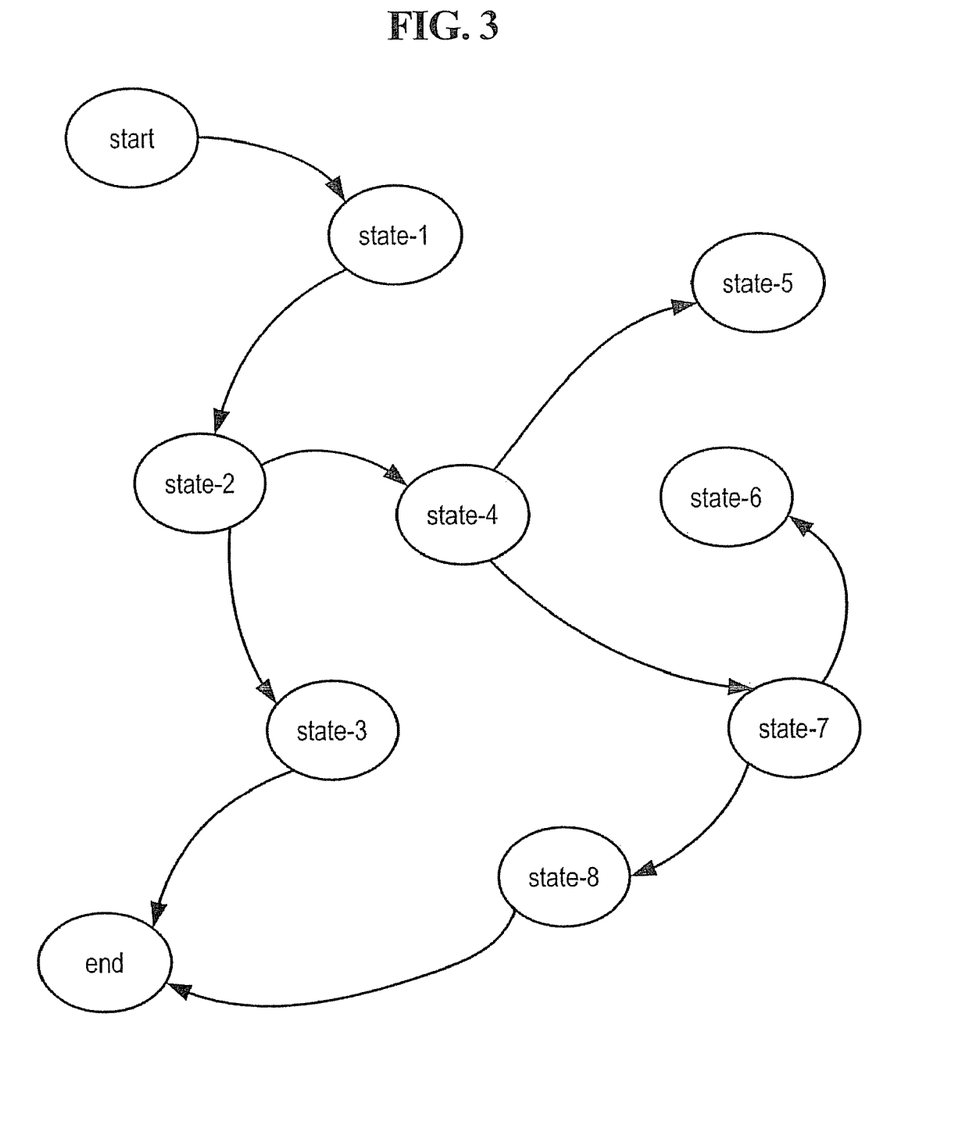
FIG. 3 is a diagram illustrating an example of a conventional spoken dialogue model using a finite state model.

FIG. 3 is a diagram illustrating an example of a conventional spoken dialogue model using a finite state model.

In the finite state model, for each state, the spoken dialogue interface apparatus queries the user and interprets the user's response to the query. At this time, each state knows the histories of previous states. For example, in state-4 shown in FIG. 3, a dialogue with the user is performed while the results of state-1 and state-2 remain known.

The dialogue in the finite state model is mainly led by the spoken dialogue interface apparatus, an example of which is an Automatic Response System (ARS).

The spoken dialogue model based on the finite state model is disclosed in U.S. Pat. No. 6,356,869.

Figure 4:
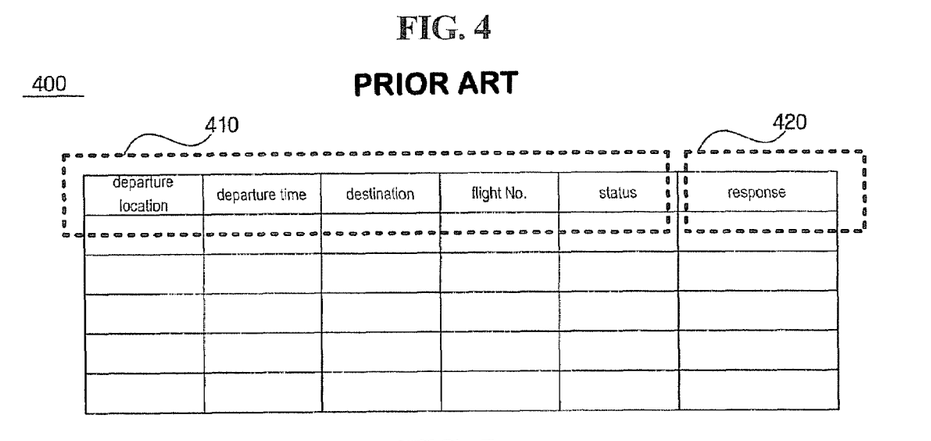
FIG. 4 is a drawing illustrating an example of a conventional spoken dialogue model using a frame-based model.

FIG. 4 is a drawing illustrating an example of a conventional spoken dialogue model using a frame-based model.

The frame-based model conducts a spoken dialogue based on a table type frame 410.

The frame 410 includes parameter fields 410 which are required in order for a user's language to be recognized by the spoken dialogue interface apparatus, and a response field 420 for which content to be used to respond to the user is set depending on values set in the parameter fields 410.

For example, in FIG. 4, the frame structure of the frame-based spoken dialogue interface apparatus for a flight reservation is shown.

The parameter fields 410 include a departure location field, a departure time field, a destination field, a flight Number field, and a current reservation status field. For example, when recognizing only information about a departure location and departure time from a user's speech, the spoken dialogue interface apparatus queries the user about the destination in response to the speech. Alternatively, when recognizing information about a departure location, departure time and a destination from the user's speech, the spoken dialogue interface apparatus informs the user of a corresponding flight number and reservation status by searching a DB for flight reservation status.

The spoken dialogue model based on the frame-based model is disclosed in U.S. Pat. No. 6,044,347.

Figure 5:
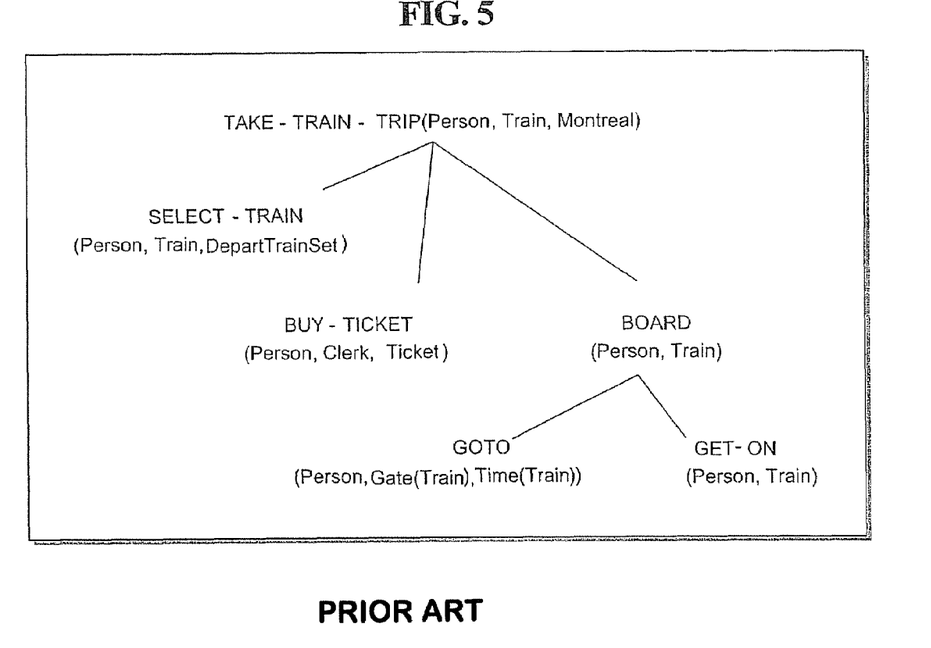
FIG. 5 is a drawing illustrating an example of a conventional spoken dialogue model using a plan-based model.

FIG. 5 is a drawing illustrating an example of a conventional spoken dialogue model using a plan-based model.

The plan-based model uses a hierarchical tree structure. In this hierarchical tree structure, the ultimate purpose of a user is located in the uppermost layer and elements necessary in order to accomplish the purpose are located in lower layers.

In FIG. 5, an example of the tree structure for a train trip is shown. For example, information about a selected train, ticket purchase, boarding time and gate is located in the lower layers. When a user requests service for a train trip, the plan-based spoken dialogue interface apparatus responds to the user request based on the tree structure shown in FIG. 5.

The spoken dialogue model based on the plan-based model is disclosed in U.S. Pat. No. 6,786,651.

Of the spoken dialogue models for the above-described spoken dialogue interface, the spoken dialogue model using the pattern matching shown in FIG. 2 enables dialogue knowledge to be easily established, but has a problem in that it cannot easily process various dialogues because it performs only simple pattern matching. Furthermore, the plan-based spoken dialogue model shown in FIG. 5 can process various dialogues, but has a problem in that vast dialogue knowledge for the various dialogues must be established. Furthermore, there is another problem in that the maintenance of the established dialogue knowledge is not easy.

As a result, a spoken dialogue model that can process various dialogues and allows knowledge to be easily established is required.

SUMMARY OF THE DISCLOSURE

Accordingly, the present disclosure has been made keeping in mind the above problems occurring in the prior art, and an object of the present disclosure is to provide a spoken dialogue interface apparatus and method, which can process various dialogues and allows knowledge to be easily established by establishing tree-structured dialogue knowledge using a domain action frame and generating a response using a back-off method.

In order to accomplish the above object, the present disclosure provides a spoken dialogue interface apparatus, including a speech recognition module for recognizing a human's speech from a sound signal; a user intention interpretation module for extracting a sentence from the recognized speech and interpreting a user's intention based on the sentence; a user intention selection module for determining user intention using the interpreted user's intention and a predetermined domain action frame; and a system response generation module for generating a system response sentence corresponding to the selected user intention; wherein the domain action frame includes service information which the user requests, and parameter information which is used to perform a service, and the domain action frame is constructed to have a hierarchical tree structure.

Furthermore, the present disclosure provides a spoken dialogue interface method, including the steps of recognizing a human's speech from a sound signal; extracting a sentence from the recognized speech and interpreting the user's intention based on the sentence; determining the user intention using the interpreted user's intention and a predetermined domain action flame; and generating a system response sentence corresponding to the selected user intention; wherein the domain action frame includes service information which the user requests, and parameter information which is used to perform a service, and the domain action frame is constructed to maintain a hierarchical tree structure.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

The present invention is described hereinafter with reference to flowchart illustrations of user interfaces, methods, and computer program products according to various embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative performances, the functions noted in the blocks may occur out of the order. For example, two blocks shown in succession may in fact be executed substantially concurrently or the blocks may sometimes be executed in the reverse order, depending upon the functionality involved.

Figure 6:
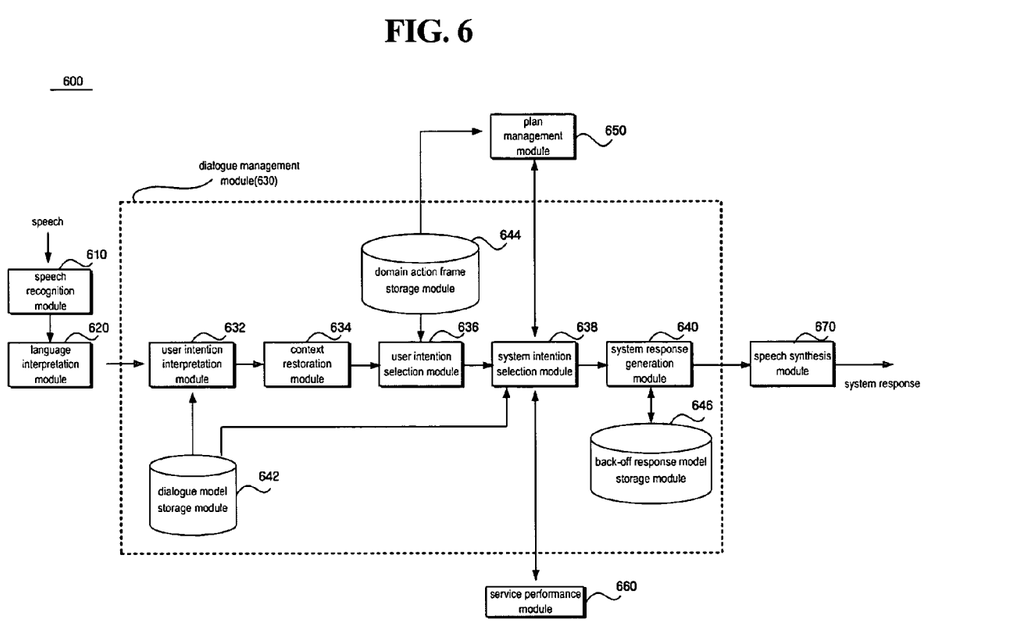
FIG. 6 is a diagram illustrating an example of a spoken dialogue interface apparatus according to an embodiment of the present invention.

FIG. 6 is a diagram illustrating an example of a spoken dialogue interface apparatus according to the present disclosure.

The spoken dialogue interface apparatus includes a speech recognition module 610, a language interpretation module 620, a dialogue management module 630, a plan management module 650, a service performance module 660 and a speech synthesis module 670.

Furthermore, the dialogue management module 630 includes a user intention interpretation module 632, a context restoration module 634, a user intention selection module 636, a system intention selection module 638, a system response generation module 640, a dialogue model storage module 642, a domain action frame storage module 644 and a back-off response model storage module 646.

The term 'module', as used herein, means, but is not limited to, a software or hardware component, such as a Field Programmable Gate Array (FPGA) or Application Specific Integrated Circuit (ASIC) for example, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The operations between the modules are described in detail below.

First, the speech recognition module 610 recognizes user speech from a sound signal. A method by which the speech recognition module 610 recognizes speech may use one of various conventional speech recognition algorithms. When the speech is recognized by the speech recognition module 610, the language interpretation module 620 extracts a text sentence from the recognized speech, and interprets the language that the user spoke based on the extracted sentence. At this time, the same extracted sentence may be interpreted variously. For example, when the user simply says "turn-off power", the spoken dialogue interface apparatus does not understand whether the sentence implies turning off a television or an audio device. As a result, the language interpretation module 620 transfers N interpretable semantic forms to the user intention interpretation module 632. The user intention interpretation module 632 determines the intention of the dialogue of the user for the N semantic forms with reference to various types of dialogue models stored in the dialogue model storage module 642.

Meanwhile, humans generally have a habit of curtailing their own speech and tend not to repeat previously spoken speech. Therefore, accounting for this characteristic of humans, the context restoration module 634 manages the histories of content previously spoken by the user, and determines the context of the content spoken by the user using the histories.

Figure 7:
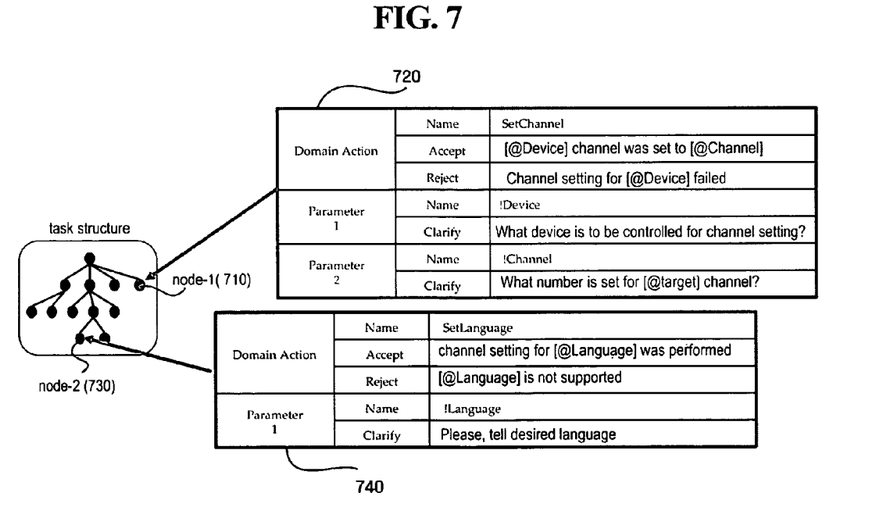
FIG. 7 is a diagram illustrating an example of the structure of a domain action frame according to an embodiment of the present invention.

The user intention selection module 636 finally selects one semantic form, which is considered to be the user's intention, from among the N semantic forms. At this time, the user intention selection module 636 extracts a domain action frame corresponding to the selected semantic form and transfers it to the system intention selection module 638. The domain action flame storage module 644 regards a service, which is provided by a predetermined domain, as one node, and each node has a hierarchical tree-type data structure. For example, when a home appliance is controlled using the spoken dialogue interface apparatus, each of a TeleVision (TV), a refrigerator, a Digital Video Disk (DVD) player and an audio device, which is targeted for control, is regarded as one domain. In each domain, for example, in a TV domain, turning on/off the power of a TV, switching a channel or adjusting volume may be viewed as services or domain actions provided by the TV domain. In FIG. 7, a domain action flame 720 for node-1 710 and a domain action flame 740 for node-2 730 are exemplified. For example, the domain action flame 720 for node-1 710 includes a domain action field which indicates a service for setting a channel, and parameter fields ('parameter 1' field and 'parameter 2' field) which are required for a channel setting service.

Figure 9:
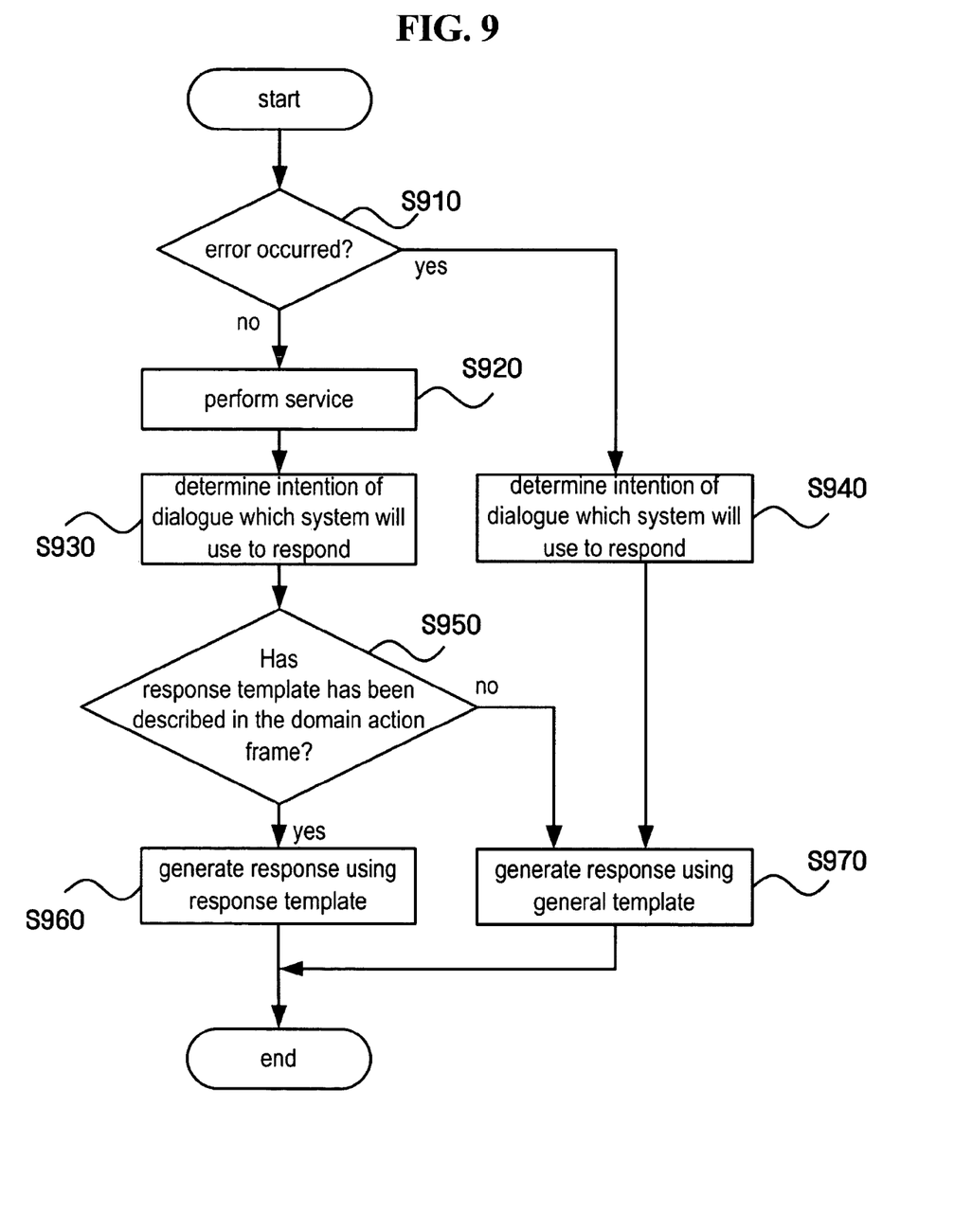
FIG. 9 is a flowchart illustrating a back-off process according to an embodiment of the present invention.

First, if it is determined that no error has occurred in information received from the user intention selection module 636, the system intention selection module 638 causes the service performance module 660 to perform the domain actions requested by the user, that is, service, at step S920 and determines the intention of dialogue that the spoken dialogue interface apparatus 600 will use to respond to the user at step S930.

Taking the domain action frame 720 shown in FIG. 7 as an example, when a user says a desired device name and a desired channel number for channel setting and the spoken dialogue interface apparatus 600 recognizes them, the intention of the system is 'Accept', and the spoken dialogue interface apparatus 600 can cause the service performance module 660 to operate, thereby setting the channel of the device. The service performance module 660 may be directly coupled to the device and cause the device to set a channel, or cause another server, which control the device, to operate, thereby setting the channel of the device. Furthermore, the response content corresponding to 'Accept' is transferred to a system response generation module 640, and the speech synthesis module 670 transforms the response content corresponding to 'Accept' into speech and then responds to the user.

When the user says only the channel number but does not say a desired device name for channel setting, the system intention selection module 638 does not cause the service performance module 660 to operate, but transfers the question "what device is to be controlled for channel setting?" as shown in the domain action frame 720 to the system response generation module 640, transforms the transferred sentence into speech and then responds to the user.

Meanwhile, the plan management module 650 generates and manages a list of domain actions required for processing user requests, in which case the plan management module 650 refers to the domain action frame storage module 644. In the case where a plurality of domain actions, that is, services, must be performed in order to satisfy the user requests, the system intention selection module 638 sequentially receives domain actions from the plan management module 650 and causes the service performance module 660 to perform the corresponding domain actions.

Figure 8:
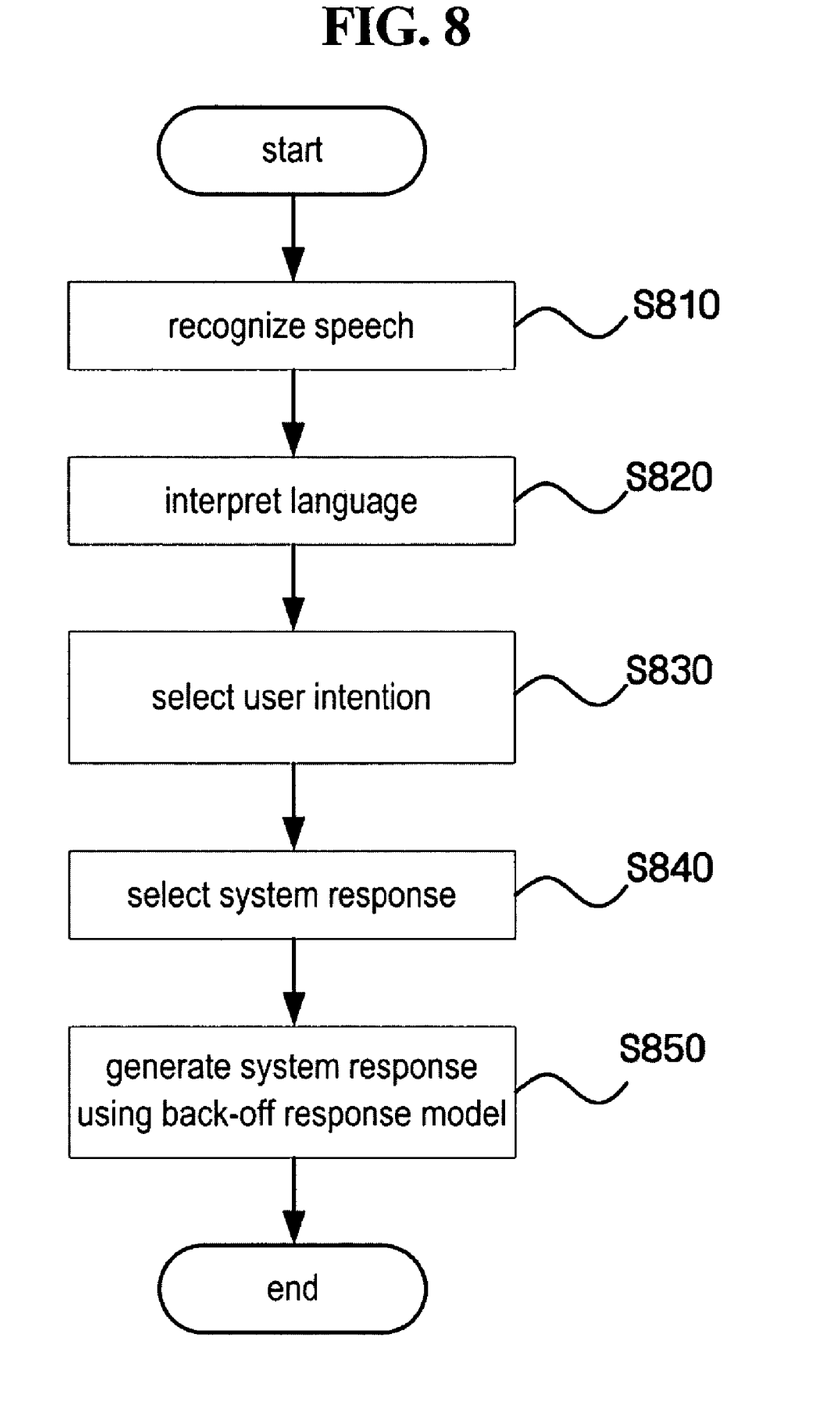
FIG. 8 is a flowchart illustrating a spoken dialogue interface method according to an embodiment of the present invention.

The operations of the spoken dialogue interface apparatus shown in FIG. 6 are summarized in the flowchart shown in FIG. 8.

That is, the spoken dialogue interface apparatus 600 recognizes the speech of the user at step S810, interprets language by extracting sentences or words from the recognized speech at step S820, and then selects a user intention at step S830.

Thereafter, the spoken dialogue interface apparatus 600 selects a response to be used to respond to the user using the selected user intention and a domain action flame corresponding to the user intention at step S840.

If some parameters are missing from the content which the spoken dialogue interface apparatus 600 will use to respond to the user, the system response generation module 640 generates a response using the back-off response model storage module 646. The back-off response model is described with reference to FIG. 9.

The system intention selection module 638 determines a system intention using a domain action frame received from the user intention selection module 636 and parameters extracted from the user speech.

At this step, the system response generation module 640 checks whether the template of content to be used to respond to the user has been described in the domain action frame as shown in FIG. 7 at step S950. If the template has been described therein, the system generates a response using the corresponding response template at step S960 and transfers the generated response to the speech synthesis module 670. However, if the template has not been described therein, the system response generation module 640 generates a response using a general template at step 970, and transfers the generated response to the speech synthesis module 670. At this step, the system response generation module 640 can obtain a general template with reference to the back-off response model 646.

Meanwhile, if it is determined that error has occurred at the step S910, the domain action that the user requests cannot be performed, so that the system intention selection module 638 determines the intention of dialogue which the interface apparatus 600 will use to respond to the user, and generates a response using the general template at step S970.

That is, the back-off response model refers to a model that can generate a response using a general template even if no response template exists in a corresponding domain action flame when the spoken dialogue interface apparatus 600 responds to the user, and the model is easily performed using the hierarchical tree structure shown in FIG. 7. That is, respective nodes are designed such that a higher node can have a more general response frame. Accordingly, for example, when there is no response template in a domain action for a certain node, it is possible to obtain a response template from a domain action frame for a higher node. The tree structure enables a domain action flame for a specified domain action to be reused, and allows the user to establish dialogue knowledge more easily.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spoken dialogue interface apparatus including a processor having computing device-executable instructions, the apparatus comprising:
   a speech recognition module, controlled by the processor, for recognizing a human's speech from a sound signal;
   a user intention interpretation module, controlled by the processor, for extracting a sentence from the recognized speech and interpreting a user's intention based on the sentence;
   a user intention selection module, controlled by the processor, for determining user intention using the interpreted user's intention and selecting a first predetermined domain action frame from a plurality of domain action frames stored in a domain action frame module; and
   a system response generation module, controlled by the processor, for generation a system response sentence corresponding to the determined user intention and the selected first domain action frame;
   wherein the first domain action frame includes service information which the user requests, and parameter information which is used to perform a service, and the first domain action frame is one of the plurality of domain action frames represented as a node in a hierarchical tree structure, and
   wherein, when a corresponding system response sentence does not exist in the first domain action frame due to missing of some parameter information with respect to the first domain action frame, the system response generation module generates a response using a back-off response model storage module, the system response sentence being generated with reference to a second domain action frame which exists in a service provided by a predetermined domain and is represented as a node in an upper layer of the hierarchical tree structure.

2. The spoken dialogue interface apparatus as set forth in claim 1, wherein the system response sentences are set in the first or second domain action frame.

3. The spoken dialogue interface apparatus as set forth in claim 1, further comprising a speech synthesis module for transforming the system response sentence generated by the system response generation module into speech and outputting it to the user.

4. The spoken dialogue interface apparatus as set forth in claim 1, further comprising a system intention selection module for performing a service based on the user intention selected by the user intention selection module and transferring performance result;
   wherein the system response generation module generates a system response sentence corresponding to the transferred results.

5. The spoken dialogue interface apparatus as set forth in claim 4, wherein the system response sentence is set in the first or second domain action frame.

6. The spoken dialogue interface apparatus as set forth in claim 4, further comprising a speech synthesis module for transforming the system response sentence generated by the system response generation module into speech and outputting it to the user.

7. A spoken dialogue interface method implemented by a spoken dialogue interface apparatus comprising a processor having computing device-executable instructions, the method comprising the steps of:
   recognizing a human's speech from a sound signal in a speech recognition module;
   extracting a sentence from the recognized speech and interpreting the user's intention based on the sentence;
   determining the user intention using the interpreted user's intention and selecting a first predetermined domain action frame from a plurality of predetermined domain action frames in a user intention selection module;
   generating a system response sentence corresponding to the determined user intention and the selected first domain action frame in a system response generation module,
   wherein the first domain action frame includes service information which the user requests, and parameter information which is used to perform a service, and the first domain action frame is one of the plurality of domain action frames represented as nodes in a hierarchical tree structure; and
   generating, by way of the processor, the system response sentence with reference to a second domain action frame when a corresponding system response sentence does not exist in the first domain action frame due to missing of some parameter information with respect to the first domain action frame, the second domain action frame being a service provided by a predetermined domain represented as a node in the hierarchical tree structure and existing in an upper layer of the hierarchical tree structure in a back-off response model storage module.

8. The spoken dialogue interface method as set forth in claim 7, wherein the system response sentence is set in the first or second domain action frame.

9. The spoken dialogue interface method as set forth in claim 7, further comprising the step of transforming the system response sentence generated by the system response generation module into speech and outputting it to the user.

10. The spoken dialogue interface method as set forth in claim 7, wherein the generating step comprises the steps of;

performing a service based on the user intention selected by the user intention selection module and transferring performance results; and generating a system response sentence corresponding to the transferred results.

11. The spoken dialogue interface method as set forth in claim 10, wherein the system response sentence is set in the first or second domain action frame.

12. The spoken dialogue interface method as set forth in claim 10, further comprising the step of transforming the system response sentence generated by the system response generation module into speech and outputting it to the user.

* * * * *